C. H. PHILLIPS.
HEADLIGHT CONTROLLING DEVICE.
APPLICATION FILED AUG. 28, 1912.
1,053,866.
Patented Feb. 18, 1913.
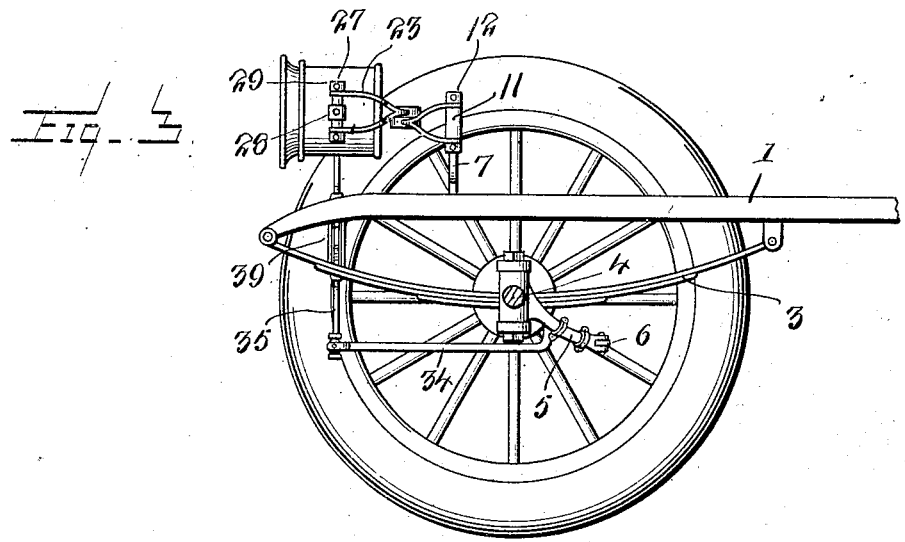
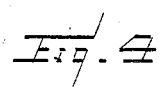
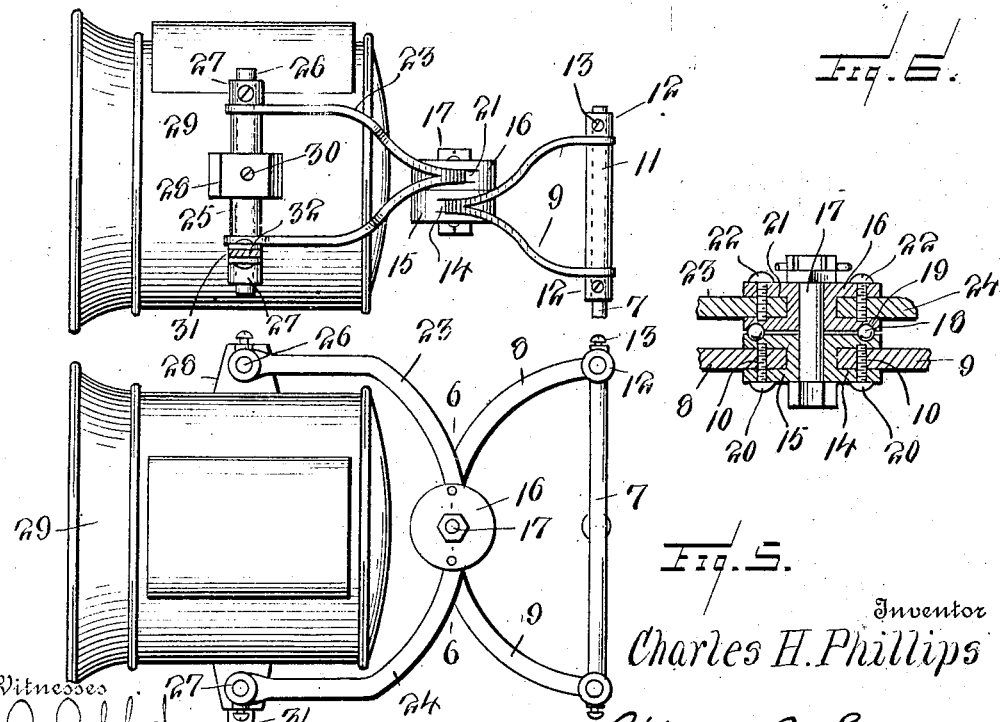

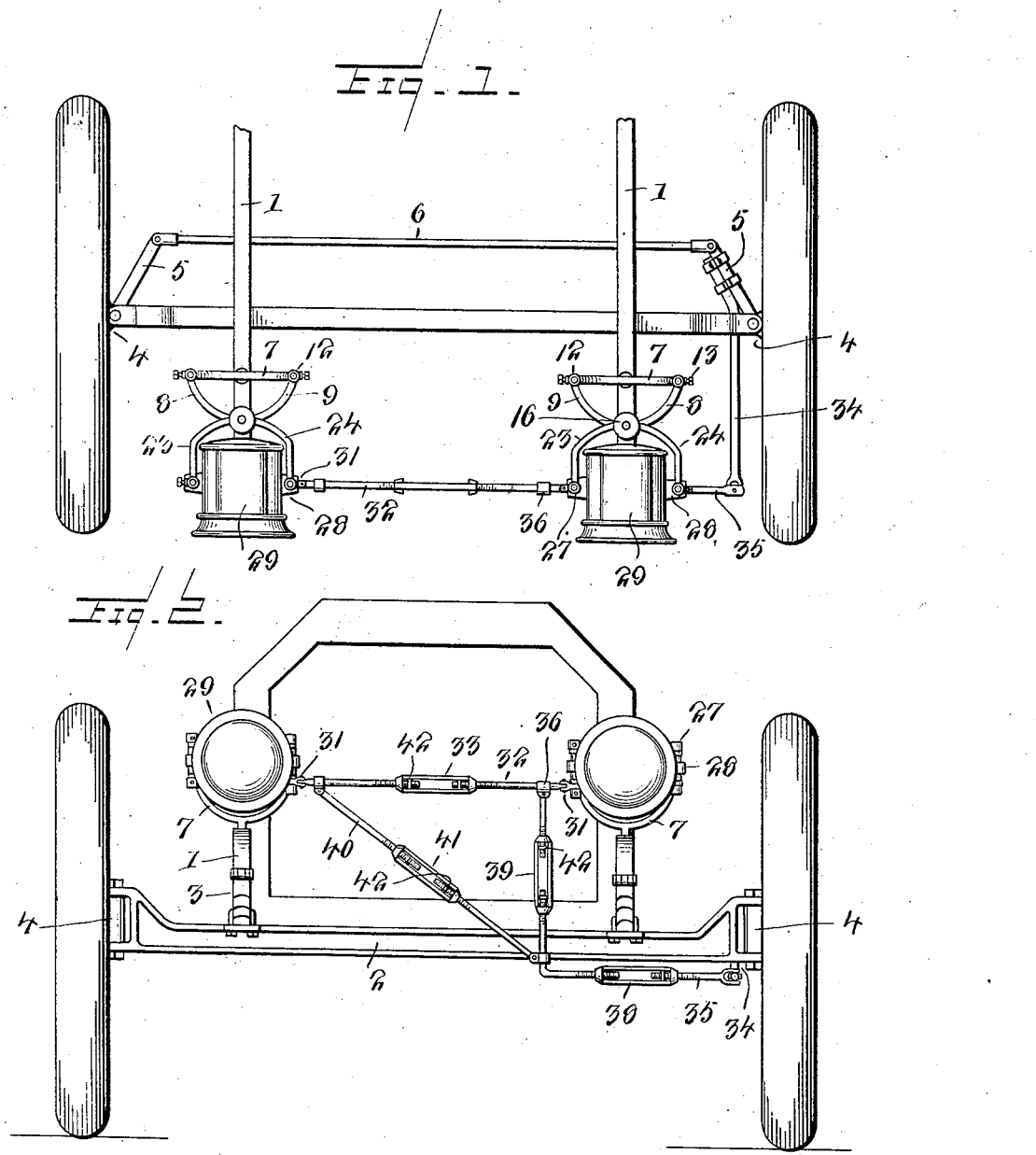

UNITED STATES PATENT OFFICE.

CHARLES H. PHILLIPS, OF POUGHKEEPSIE, NEW YORK, ASSIGNOR OF ONE-THIRD TO WILLIAM N. WETTERAU, OF POUGHKEEPSIE, NEW YORK.

HEADLIGHT-CONTROLLING DEVICE.

1,053,866.  Specification of Letters Patent.  Patented Feb. 18, 1913.

Application filed August 28, 1912. Serial No. 717,543.

*To all whom it may concern:*

Be it known that I, CHARLES H. PHILLIPS, a citizen of the United States, residing at Poughkeepsie, in the county of Dutchess and State of New York, have invented new and useful Improvements in Headlight-Controlling Devices, of which the following is a specification.

This invention relates to head light controlling devices and particularly to that type which are adapted for simultaneous control of the head lights of automobiles and like vehicles.

One of the principal objects of the invention is to provide a simple and efficient controlling mechanism for the head lights of vehicles such as automobiles and the like, whereby the old lamp brackets may be used.

A further object of the invention is the provision of a device of this character which may be applied to the old lamp bracket and which is so constructed that it is adjustable to all sizes of brackets, thereby preventing the necessity of supplying special parts to connect up the lamps.

Further objects of this invention will appear as the following specific description is read in connection with the accompanying drawing, which forms a part of this application, and in which:—

Figure 1 is a detail top plan view. Fig. 2 is a front elevation. Fig. 3 is a side elevation. Fig. 4 is a detail side elevation of the lamp supporting device on an enlarged scale. Fig. 5 is a top plan view thereof. Fig. 6 is a detail sectional view on the line 6—6 of Fig. 5.

Referring more particularly to the drawings, 1 represents the side bars of the chassis of an ordinary motor vehicle which are connected to the front axle in the usual manner by springs 3. The axle has pivoted thereto, as is usual, the wheel spindles 4 each provided with a steering arm 5, which steering arms are connected together, as is usual, by a connecting link 6. The side bars have mounted thereon the usual bifurcated lamp brackets 7, as shown.

The attachment comprises a pair of arms 8 and 9, each of which are constructed of separate parts joined together at one end and provided with an aperture 10. The opposite ends of the parts of each arm are spread apart and mounted upon the legs of the brackets 7 being held in separated position by a sleeve 11 which surrounds the bracket arm. The separate parts of the arms are held in engagement with the sleeve and against displacement of the arms of the bracket by collars 12 secured in position upon the arm by set screws 13. The ends of the arms 8 and 9 are seated in recesses 14 formed in opposite sides of a disk 15 which is secured for relative movement to a disk 16 by means of a bolt 17. These disks are held in separated relation and freely rotatable on one another by means of a series of antifriction balls 18 interposed between the disks in ball recesses 19. The ends of the arms are secured in the disk 15 by means of bolts 20 which pass through the apertures 10 before mentioned. The recesses 14 are of such character as to readily permit the separation of the outer ends of the arms 8 and 9 so as to provide for brackets of different widths; in other words, to accommodate the device to brackets having arms of different separation.

Secured in recesses 21 in the disk 16 by means of the bolts 22 are similar arms 23 and 24, each constructed of two parts welded together at the ends which engage the disks and have their opposite ends separated by a sleeve 25, the arms being apertured to receive a shaft 26 and being held in engagement with the sleeve 25 by collars 27 in a similar manner to the arms 8 and 9. The sleeves 25 are secured in lugs 28 formed on the side of the lamps 29 by means of set screws 30 and the inner sleeves are provided with laterally extending ears 31 which are connected together by a coupling rod 32 extending between the two lamps and provided with a turn buckle 33 for adjusting the length of the same.

Clamped to one of the steering arms 5 is an operating arm 34 pivotally connected to a link 35 which extends horizontally substantially parallel with the axle 2 and then vertically where it is connected to the rod 32 by means of the clamp 36. The horizontal and vertical portions of this link 35 are provided with turn buckles 38 and 39 adapted to adjust the same to adapt the attachment to different types of vehicles. Extending between the lower part of the vertical portion of the link 35 and between the opposite ends of the link 32 is a connecting or bracing strut 40 having a turn buckle 41 arranged within its length. It will be noticed that each section of the links 32 and 35 and 40 have their threaded ends provided with apertures to receive cotter keys 42 by which the turn buckles are held against rotation, thereby preventing any change of the adjustment.

What is claimed is:—

1. In combination, lamp supporting brackets, oppositely arranged pairs of converging arms, a lamp arranged between one pair, the opposite pair being connected to the lamp brackets, and means for pivotally connecting the pairs of arms together.

2. In combination, lamp supporting brackets, of oppositely disposed pairs of converging arms, certain of said pairs of arms being connected to the lamp brackets, lamps mounted between the other pairs of arms, means for pivotally connecting the converging arms of each pair together, means for pivotally connecting the opposite pairs together, means for connecting the separate lamps, and means for simultaneously operating the same.

3. In combination, a bifurcated lamp bracket, a pair of converging arms having one end thereof connected to the separate legs of the lamp bracket, a plate connected to the opposite ends of said arms, a second plate revolubly mounted upon the first plate, diverging arms secured thereto, and a lamp mounted between the ends of said diverging arms.

4. In combination, a bifurcated lamp bracket, a pair of converging arms pivotally mounted upon the legs of the lamp bracket at one end, a plate pivotally connected to the opposite ends of said arms, a second plate pivotally mounted upon the first plate, antifriction balls arranged between said plate, a pair of diverging arms mounted upon the second plate, a lamp arranged between said diverging arms, and means to rotate the second plate upon the first plate.

5. The combination with a motor vehicle having a steering mechanism and lamp brackets, of means for pivotally connecting a pair of lamps to said brackets, of an adjustable connection between the mounting means, an adjustable connection between the steering mechanism and the aforesaid connection, and an adjustable brace extending between the connections.

In testimony whereof I affix my signature in presence of two witnesses.

CHARLES H. PHILLIPS.

Witnesses:
E. EDMONSTON, Jr.,
M. FROTHINGHAM.

Copies of this patent may be obtained for five cents each, by addressing the "Commissioner of Patents, Washington, D. C."